United States Patent [19]
Barthel et al.

[11] 3,875,295

[45] Apr. 1, 1975

[54] PROCESS FOR WITHDRAWING HYDROGEN SULFIDE FROM AN INDUSTRIAL GAS WITH SULFUR PRODUCTION

[75] Inventors: Yves Barthel, Paris; Sigismond Franckowiak, Montesson; Philippe Renault, Noisy-Le-Roi, all of France

[73] Assignee: Institut Francais du Petrole, des Carburants et Lubrifiants, Rueil-Malmaison, France

[22] Filed: May 30, 1973

[21] Appl. No.: 365,291

[30] Foreign Application Priority Data
June 1, 1972 France .............................. 72.19808

[52] U.S. Cl. .............................................. 423/575
[51] Int. Cl. ............................................ C01b 17/04
[58] Field of Search ........... 423/573, 574, 575, 576

[56] References Cited
UNITED STATES PATENTS

| | | | |
|---|---|---|---|
| 2,765,217 | 10/1936 | Conroy et al. | 423/573 |
| 3,781,445 | 12/1973 | Moss et al. | 423/575 X |

FOREIGN PATENTS OR APPLICATIONS

| | | | |
|---|---|---|---|
| 1,151,398 | 5/1969 | United Kingdom | 423/573 |
| 535,737 | 2/1955 | Belgium | 42/574 |

*Primary Examiner*—G. O. Peters
*Attorney, Agent, or Firm*—Millen, Raptes & White

[57] ABSTRACT

Hydrogen sulfide is removed and sulfur produced by contacting a $H_2S$-containing gas with sulfur dioxide in reduced proportion, so as to form sulfur; the effluent gas, containing residual hydrogen sulfide, is contacted with an absorbent solution for $H_2S$ absorption; absorbed $H_2S$ is released and burnt for supplying sulfur dioxide.

10 Claims, 1 Drawing Figure

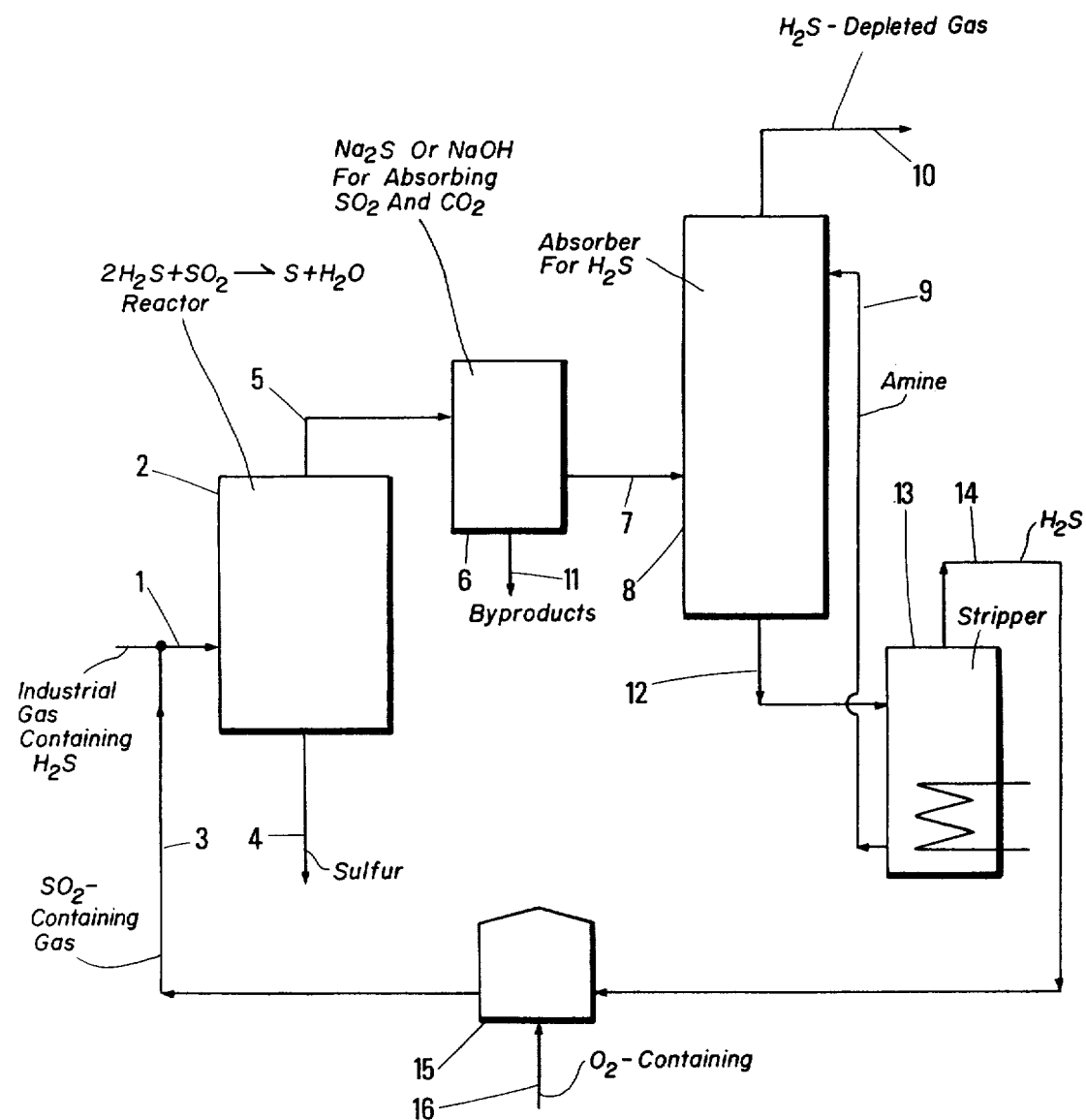

PROCESS FOR WITHDRAWING HYDROGEN SULFIDE FROM AN INDUSTRIAL GAS WITH SULFUR PRODUCTION

Refinery gases from, for example, hydrotreatment units, often contain large amounts of hydrogen sulfide and must be purified before being used as fuel-gas. Hydrogen sulfide is also present in the waste gases from gas plants and in some industrial or synthetic gases.

These gases also contain, for example, hydrogen, carbon dioxide and/or gaseous hydrocarbons.

A known process for purifying such gases consists of washing them with solutions of adsorbents, for example amines, so as to separate hydrogen sulfide, from the hydrocarbons. The hydrogen sulfide is recovered and must be thereafter converted to sulfur, for example, in a Claus plant. These two steps are costly, particularly when sulfur is produced in low amount.

We have now discovered, and this is the object of the invention, a more efficient way to transform hydrogen sulfide contained in an industrial gas to sulfur, by using a lower amount of adsorbent than in the conventional plants, i.e., only about one third of the usual amount.

The process of the invention comprises contacting the raw gas containing hydrogen sulfide, in a reaction medium comprising an organic solvent, with a gas containing sulfur dioxide in a proportion lower than the stoichiometrical one, so as to produce sulfur, which is separated, and a gas outflow containing unreacted hydrogen sulfide, which is then contacted with a solution of a hydrogen sulfide adsorbent, so as to obtain a solution whose further treatment yields a gas which is burnt for obtaining sulfur dioxide employed for treating the raw gas.

As organic solvent we may use, for example, a glycol, a poly-glycol, a glycol or poly-glycol ester or ether optionally containing a catalyst; this reaction medium has been described, for example, in the French Pat. Nos. 1,492,013, 1,782,562 and 1,592,092 or 3,598,529 and 3,441,379.

The mixture of impure gas and sulfur dioxide is preferably such that the molar ratio of the contacted acid gases $H_2S/SO_2$ is about 3. When using this ratio, no addition of fresh reactants is required and the undesirable gases are efficiently removed. The process may work, however, although it is less advantageous, with a molar ratio $H_2S/SO_2$ in the range of, for example, from 2.5 to 4.

In these conditions, only hydrogen sulfide is present in the outflow issuing from the reactor where $SO_2$ and $H_2S$ are converted to elemental sulfur, since all the sulfur dioxide was converted by reaction with the hydrogen sulfide which is in excess over the amount required by the occuring reaction:

$$2 H_2S + SO_2 \rightarrow 3 S + 2 H_2O$$

Following this step, a part only, about one third of the hydrogen sulfide contained in the raw gas to be purified remains in the gas mixture issuing from the conversion reactor.

This mixture is thereafter purified by conventional washing, for example washing with amines or hot potassium carbonate. The so recovered hydrogen sulfide is passed to an oven where it is burnt in the presence of air, oxygen or an oxygen-containing gas mixture, so as to be converted essentially to sulfur dioxide. The so-produced gas is admixed with the raw gas at the inlet of the conversion reactor, in the above indicated proportions.

The industrial gases which can be treated according to the invention are usually at an absolute pressure of from 1 to 20 bars, preferably 3 to 5 bars.

The gas reacted with the industrial gas, in the conversion reactor, may contain $SO_2$ alone or admixed with inert gases, for example nitrogen, carbon dioxide or steam, depending on the way the oven is fed.

An absorption vessel containing an alkaline solution, for example a solution of sodium or potassium hydroxide, is advantageously provided at the outlet of the conversion reactor, particularly when the reacted gas contains carbon dioxide, so as to avoid any accumulation of the latter in the circuit, and also to avoid any introduction of possible traces of $SO_2$ into the washing stage. The proportion of sodium hydroxide to be used is the stoichiometrical amount required for neutralizing the undesired gases, for example $CO_2$ and $SO_2$. An excess of alkaline solution must be avoided so as to prevent any substantial absorption of $H_2S$ at this intermediary step of the process.

The accompanying drawing illustrates the invention.

A hydrogen sulfide containing gas is fed through line 1 to a reactor 2 containing an organic solvent, for example polyethylene glycol having an average molecular weight of 400, and a catalyst, for example potassium benzoate, and maintained at about 130°C. A $SO_2$-containing gas is fed through line 3. The resulting sulfur is removed through line 4. The treated gas is removed through line 5 and passed through an absorber 6 containing concentrated sodium hydroxide and/or sodium sulfide in the amount required for absorbing residual $CO_2$ and $SO_2$, not $H_2S$.

The by-products, when formed, may be removed through pipe 11. The gas is then fed through line 7 to a column 8 containing a circulating solution of amine supplied from line 9. It is removed, in a purified state, through line 10.

The amine solution which has absorbed $H_2S$ is removed through line 12; it is fed to the stripper 13 where it is treated by heat. The regenerated amine solution is passed through line 9 to the column 8, and the resulting gas outflow, containing $H_2S$, is supplied through line 14 to a burner 15 fed with air, oxygen or a mixture of the same from line 16.

The burnt gas containing a proportion of $SO_2$ corresponding to $H_2S$ supplied to the burner, i.e., $H_2S$ unconverted in the reactor 2, is fed through line 3 to the reactor 2.

The following examples are given by way of illustration, not of limitation.

EXAMPLE 1

100 m³ per hour of a gas at an initial pressure of 3 bars are treated in a reactor containing polyethylene glycol of a 400 average molecular weight, maintained at the temperature of 140°C.

The composition by volume of the gas is :

An aqueous solution of potassium benzoate providing 150 g per hour of said benzoate is fed to the medium.

The reactor is also fed with 40 m³ per hour of gas containing by volume:

| | |
|---|---|
| SO₂ | 12.5% |
| H₂O | 12.5% |
| N₂ | 75% |

Sulfur forms and separates.

The $H_2S$ content of the gas discharged from the reactor amounts to 5 m³ per hour. This gas is fed to an amine treatment plant, for example a plant containing an aqueous solution of diethanolamine at a 30 % by weight concentration.

The purified gas evolves from the plant with a 10 ppm $H_2S$ content by volume. The amine is regenerated by stripping of $H_2S$ contained therein.

The effluent gas from the amine regeneration step is passed to a furnace where it is completely converted to $SO_2$ by means of air. The effluent gas from the furnace constitutes the hereinbefore mentioned $SO_2$-containing gas.

The whole plant is maintained under a pressure of 3 bars. About 21 kg of sulfur are recovered per hour.

EXAMPLE 2

A gas containing, by volume:

| | |
|---|---|
| H₂S | 12% |
| H₂ | 80% |
| hydrocarbons (essentially CH₄ and C₂H₆ | 8% | hydrocarbons (essentially $CH_4$ and $C_2H_6$ 8% is supplied under a 6 bars pressure.

2,200 m³ of this gas are treated in a reactor containing polyethylene glycol of a 400 molecular weight, at a temperature of 135°C; an aqueous solution of sodium benzoate, providing 150 g of salt per hour, is also fed thereto.

A gas mixture is also supplied to the reactor from a burner fed with oxygen and $H_2S$-containing gas. The feeding rate is selected so as to introduce into the reactor 88m³ of $SO_2$ per hour.

38 kg of sulfur per hour are formed in the reactor and removed therefrom.

The gas evolved from the reactor contains 88 m³ per hour of $H_2S$, hydrogen, hydrocarbons, water and about 50 ppm of $SO_2$; it is fed to an absorber containing sodium hydroxide where a large portion of its water content and traces of $SO_2$ are removed. This absorber contains a sodium hydroxide solution which is converted by sulfurization essentially to sodium sulfite which is removed. The consumption of sodium hydroxide solution is compensated by adding 450 g/hour of HONa.

The gas evolved from the absorber is fed to a hot potassium carbonate washing plant also under a pressure of 6 bars, and evolves in a purified state, with a 10 ppm content of $H_2S$ by volume.

The regeneration of the carbonate solution carried out under a lower pressure provides a gasous effluent containing 88 kmoles of $H_2S$ and water and which is conveyed to a burner fed with oxygen, so as to obtain $SO_2$ which is dried. $SO_2$ may be liquefied in a condensation step; it is then injected under a pressure of 6 bars into the conversion reactor.

What we claim is:

1. A process for removing hydrogen sulfide from an $H_2S$-containing industrial gas while concurrently producing sulfur, said process comprising:
    a. reacting said $H_2S$-containing industrial gas in a reaction mixture containing an organic solvent with an $SO_2$-containing gas, the molar ratio of the $H_2S$ : $SO_2$ reactants being 2.5 : 1 to 4 : 1, respectively, to produce sulfur and an effluent gas containing $H_2S$;
    b. removing the sulfur from the reaction mixture;
    c. passing said effluent gas into contact with a solution of $H_2S$-absorbing agent to obtain an $H_2S$-depleted gaseous effluent and an $H_2S$-containing solution;
    d. desorbing said $H_2S$-containing solution to obtain $H_2S$;
    e. burning said $H_2S$ with a gas containing molecular oxygen to form sulfur dioxide; and
    f. utilizing resultant sulfur dioxide as said $SO_2$-containing gas in step (a).

2. A process according to claim 1, wherein hydrogen sulfide and sulfur dioxide are contacted in a molar ratio of about 3:1.

3. A process according to claim 1, wherein the industrial gas contains both hydrogen sulfide and hydrogen or a hydrocarbon.

4. A process according to claim 1, wherein the $H_2S$-absorbing agent is an amine.

5. A process according to claim 1, wherein the organic solvent is selected from the group consisting of glycols, poly-glycols and esters and ethers of said glycols and said poly-glycols.

6. A process according to claim 1, wherein the industrial gas also contains carbon dioxide and said effluent gas containing $H_2S$ is washed with a sodium or potassium hydroxide solution before the contact with the solution of the $H_2S$-absorbing agent.

7. A process according to claim 1, wherein said desorbing is conducted by heating the solution containing the absorbed $H_2S$.

8. A process according to claim 4, wherein said desorbing is conducted by heating the amine solution containing absorbed $H_2S$.

9. A process according to claim 8, wherein the industrial gas also contains carbon dioxide and said effluent gas containing $H_2S$ is washed with a sodium or potassium hydroxide solution before the contact with the solution of the $H_2S$-absorbing agent.

10. A process according to claim 9, wherein hydrogen sulfide and sulfur dioxide are contacted in a molar ratio of about 3 : 1.

* * * * *